(12) United States Patent
Volkmann et al.

(10) Patent No.: US 10,102,092 B2
(45) Date of Patent: Oct. 16, 2018

(54) TESTING FRONT END MODULE, TESTING METHODS AND MODULAR TESTING SYSTEMS FOR TESTING ELECTRONIC EQUIPMENT

(71) Applicant: Rohde & Schwarz GmbH & Co. KG, Munich (DE)

(72) Inventors: Jens Volkmann, Birnbach (DE); Thomas Lutz, Munich (DE); Walter Schmitz, Otterfing (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 0 days.

(21) Appl. No.: 14/635,863

(22) Filed: Mar. 2, 2015

(65) Prior Publication Data

US 2016/0259700 A1  Sep. 8, 2016

(51) Int. Cl.
  *G06F 11/00*  (2006.01)
  *G06F 11/263*  (2006.01)
  *G06F 11/273*  (2006.01)

(52) U.S. Cl.
  CPC .......... *G06F 11/263* (2013.01); *G06F 11/273* (2013.01)

(58) Field of Classification Search
  USPC .......................................................... 714/27
  See application file for complete search history.

(56) References Cited

U.S. PATENT DOCUMENTS

| 6,169,413 B1 * | 1/2001 | Paek ................... G06F 11/2221 324/750.05 |
| 7,564,893 B2 | 7/2009 | O'Neill |
| 7,884,599 B2 * | 2/2011 | Habib .............. G01R 31/31723 324/750.3 |
| 7,962,823 B2 | 6/2011 | Olgaard |
| 8,085,685 B2 | 12/2011 | Olgaard |
| 8,170,490 B2 | 5/2012 | Olgaard et al. |

(Continued)

FOREIGN PATENT DOCUMENTS

| CN | 102265664 A | 11/2011 |
| CN | 102362450 A | 2/2012 |

(Continued)

OTHER PUBLICATIONS

Non-Final Office Action for U.S. Appl. No. 14/633,966 (dated Aug. 12, 2016).

(Continued)

*Primary Examiner* — Amine Riad
(74) *Attorney, Agent, or Firm* — Shumaker & Sieffert, P.A.

(57) ABSTRACT

A testing method for testing a plurality of devices under test (DUT) includes transmitting first testing routine signals from a first backend controller to a testing front end module via a wired data connection between the first backend controller and a first testing signal interface of the testing front end module, transmitting second testing routine signals from a second backend controller to the testing front end module via a wired data connection between the second backend controller and a second testing signal interface of the testing front end module, prioritizing one of the first and second testing routine signals according to predefined priority criteria in the testing front end module, and generating testing signals in the testing front end module on the basis of the prioritized testing routine signals.

19 Claims, 2 Drawing Sheets

(56) References Cited

U.S. PATENT DOCUMENTS

| | | |
|---|---|---|
| 8,774,729 B2 | 7/2014 | Olgaard et al. |
| 8,842,549 B2 | 9/2014 | Olgaard et al. |
| 8,842,552 B2 | 9/2014 | Olgaard et al. |
| 8,982,936 B2 | 3/2015 | Yang et al. |
| 9,100,182 B2 | 8/2015 | Olgaard et al. |
| 9,274,175 B2* | 3/2016 | Golov ............... G01R 31/31907 |
| 2005/0240852 A1* | 10/2005 | Inaba ................ G01R 31/3167 714/740 |
| 2008/0285467 A1 | 11/2008 | Olgaard |
| 2009/0092177 A1* | 4/2009 | Dvorak ............... H04B 17/101 375/224 |
| 2010/0077270 A1 | 3/2010 | Rupp et al. |
| 2010/0123471 A1* | 5/2010 | Olgaard ................ H04L 1/06 324/750.3 |
| 2010/0127918 A1* | 5/2010 | Vadlamani ............ G01S 19/23 342/357.62 |
| 2010/0268459 A1* | 10/2010 | O'Shea ................ G01C 25/00 701/532 |
| 2012/0123723 A1 | 5/2012 | El-Hassan et al. |
| 2013/0243057 A1* | 9/2013 | Dark .................. H04L 1/248 375/224 |
| 2013/0266052 A1 | 10/2013 | Yang et al. |
| 2013/0326291 A1* | 12/2013 | Elserougi ............. H04B 17/15 714/712 |
| 2014/0090799 A1* | 4/2014 | Waniuk ................ B22D 17/04 164/493 |
| 2015/0244477 A1* | 8/2015 | Hirst .................. H04B 17/15 455/67.14 |
| 2016/0253252 A1 | 9/2016 | Holzmann et al. |

FOREIGN PATENT DOCUMENTS

| | | |
|---|---|---|
| CN | 103368666 A | 10/2013 |
| CN | 104272120 A | 1/2015 |

OTHER PUBLICATIONS

Hsiao et al., "Bit Error Rate Measurement System for RF Integrated Circuits," Instrumentation and Measurement Technology Conferenec (I2MTC), 2012 International, p. 1-4 (May 2012).

First Office Action, and translation thereof, from counterpart Chinese Application No. 201510280254.8, dated Jun. 14, 2018, 16 pp.

* cited by examiner

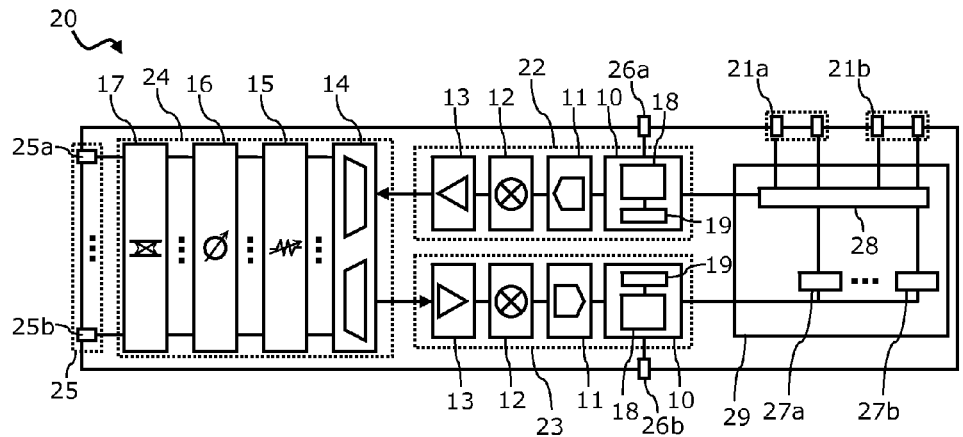
Fig. 3
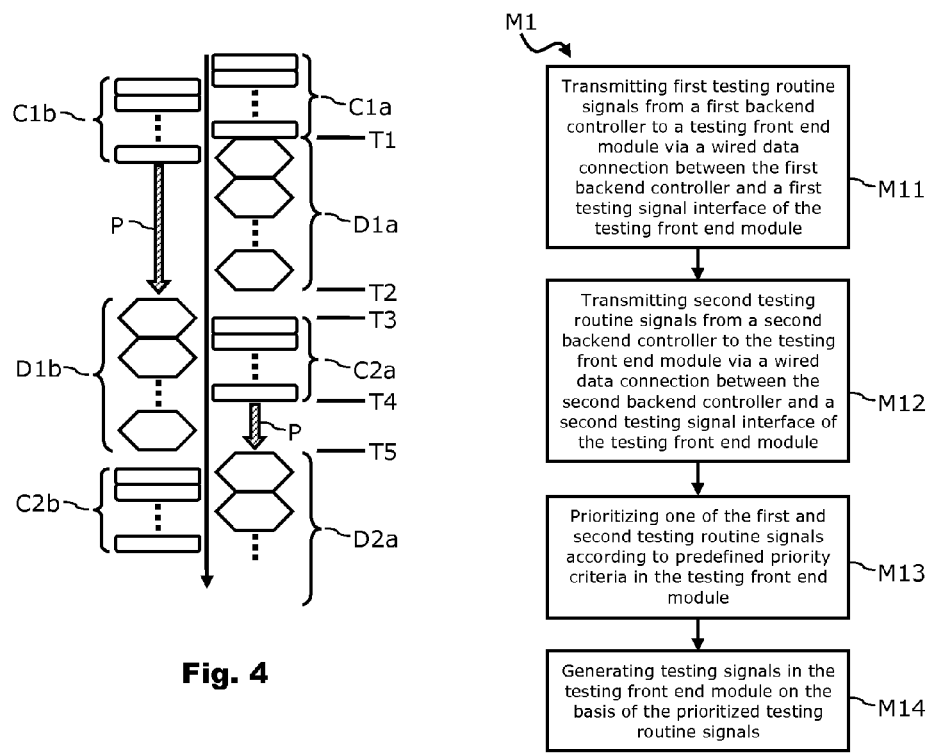
Fig. 4
Fig. 5

TESTING FRONT END MODULE, TESTING METHODS AND MODULAR TESTING SYSTEMS FOR TESTING ELECTRONIC EQUIPMENT

FIELD OF THE INVENTION

The present invention relates to testing front end modules, testing methods and modular testing systems. Such modules, methods and systems may be employed for testing electronic equipment, particularly mobile communication devices and mobile computing devices.

BACKGROUND OF THE INVENTION

Electronic equipment, such as a mobile communication device or a mobile computing device, is subject to various electronic tests after production. Such tests are generally necessary to ensure proper configuration, calibration and functionality of various elements of the devices under test (DUT). For testing purposes, specific testing devices are employed which simulate a testing environment under predefined testing conditions. For example, testing devices may employ one or more specific testing routines with predefined testing schedules. Those testing schedules regularly involve input of particular test signal sequences into the DUT and/or reception of responses to testing signals input to the DUT. Such responses may be evaluated for consistency, constancy, timeliness and other properties of an expected behaviour of the DUT.

Of particular relevance are tests and testing devices for electronic equipment which is operated in an environment sensitive to radio frequency (RF) signals. Such equipment may be used to output, receive, measure or otherwise process RF-sensitive parameters and signals. Those tests are conventionally performed using standardized testing routines conducted by specifically designed testing equipment that is connected to a DUT.

Testing contemporary DUTs is currently very time-consuming: Given the high complexity of modern electronic equipment and its proliferation as mass product, testing each and every DUT suffers from potentially low throughput and high costs associated with the testing cycles, slowing down manufacturing processes and verification procedures. Thus, there is an increasing demand in solutions for testing multiple electronic devices in a more efficient manner. In particular, solutions that improve testing speed, testing quality and testing costs of electronic equipment, particularly RF-sensitive equipment, are highly sought after.

For example, document US 2010/0077270 A1 discloses a testing arrangement for testing a plurality of communication devices which emit a plurality of signals, each including a signal from each of the plurality of communication devices. The received signals are combined into a combined signal that is evaluated by a controller.

SUMMARY OF THE INVENTION

According to the disclosure of present invention testing methods, testing front end modules and modular testing systems may be implemented.

Specifically, according to a first aspect of the invention, a testing method for testing a plurality of devices under test (DUT) includes transmitting first testing routine signals from a first backend controller to a testing front end module via a wired data connection between the first backend controller and a first testing signal interface of the testing front end module, transmitting second testing routine signals from a second backend controller to the testing front end module via a wired data connection between the second backend controller and a second testing signal interface of the testing front end module, prioritizing one of the first and second testing routine signals according to predefined priority criteria in the testing front end module, and generating testing signals in the testing front end module on the basis of the prioritized testing routine signals.

According to a second aspect of the invention, a testing front end module for testing a plurality of devices under test (DUT) includes at least two testing signal interfaces for coupling different backend controllers to the testing front end module, a vector signal generator (VSG) coupled to the testing signal interface and configured to generate testing signals upon reception of testing routine signals from a remote controller via the testing signal interface, a vector signal analyser (VSA) coupled to the testing signal interface and configured to receive testing response signals from a plurality of DUTs and to transmit the received testing response signals to the remote controller via the testing signal interface, and a buffering module coupled to the at least two testing signal interfaces and configured to receive first and second testing routine signals from a first and second backend controller, respectively, to prioritize one of the first and second testing routine signals according to predefined priority criteria and to transmit the prioritized one of the first and second testing routine signals to the VSG for generating testing signals for the plurality of DUTs on the basis of the prioritized one of the first and second testing routine signals.

According to a third aspect of the invention, a modular testing system for testing a plurality of devices under test (DUT) includes a testing front end module according to one of the aspects of the invention, and at least two backend controllers coupled to respective ones of the at least two testing signal interfaces of the testing front end module via a wired data connection.

One idea of the present invention is to separate the testing front end module from the backend controller that is responsible for controlling the testing routines and for evaluating the testing results. Additionally, the testing front end module may then be configured to be connected to more than one backend controller at once, with each connected backend controller being able to independently access the functionality of the signal generators and signal analyzers within the testing front end module. In order to avoid interference between the independently operating backend controllers, the testing front end module is equipped with a buffering module that evaluates the incoming usage requests of the various backend controllers and puts them in a buffering pipeline for access to the functional components of the testing front end module.

Deliberately omitting module internal controllers in the testing front end module may provide for a smaller, lighter and more efficient portable device that may be placed very near to the DUTs, i.e. "on-site". Moreover, the capabilities of the testing front end module may be used more efficiently since the resources of the functional components of the testing front end module may be distributed among several independently operating backend controllers. This is particularly useful because testing routines usually include downtimes for the signal generator and analyzer during which only the backend controller is effectively needed, for example the preparatory configuration of a DUT for a test to be performed, the evaluation of gathered testing response signals or similar. During that time, the functional components of the testing front end module are idle with respect to that particular backend controller. By offering the functions of the testing front end module during the idle time regarding one backend controller to another connected backend controller, the overall idle time of the testing front end module may be significantly reduced, thus leading to higher throughput, better efficiency and reduced overall testing time for a batch of DUTs.

Amongst others, there are several specific advantages associated with such testing front end modules and their concomitant testing methods. The testing front end module may be less expensive to implement since most controlling functions may be outsourced. The data transfer between the external controller and the testing front end module may be standardized and may rely on conventional data transfer protocols. The modular implementation and the standardized data transfer concept allow for high flexibility in the choice of controllers and controller types. The whole testing system may be easily adapted to the testing environment due to the flexible connection between the backend controllers and the testing front end module.

Due to the light implementation of the testing front end module and the modularized testing methods, the power supply for the testing front end module has less power requirements as well. Thus, the power supply may be outsourced and the cooling concept for the "on-site" module may be simplified. Eventually, passive cooling concepts may be sufficient, thus eliminating the need for complex active cooling and thereby reducing implementation costs and energy consumption.

The modularity of the whole testing systems further allows for very flexible adaptation on the number of DUTs and/or the number of tests to be performed in parallel. Specifically for the growing technical and functional diversification of mobile communication and computing devices, such flexibility may be put to great use when trying to efficiently and quickly meet testing demands on time.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the accompanying drawings. Elements in the drawings are illustrated for simplicity and clarity and have not necessarily been drawn to scale.

FIG. 3 schematically illustrates a testing front end module according to a further embodiment of the invention.

FIG. 4 shows a signalling sequence chart of signals for a testing method for testing electronic equipment according to another embodiment of the invention.

FIG. 5 shows a flowchart of procedural stages of a testing method for testing electronic equipment according to a further embodiment of the invention.

In all figures of the drawings elements, features and components which are the same or at least have the same functionality have been provided with the same reference symbols, unless explicitly stated otherwise.

DETAILED DESCRIPTION OF THE EMBODIMENTS

Figure 1:
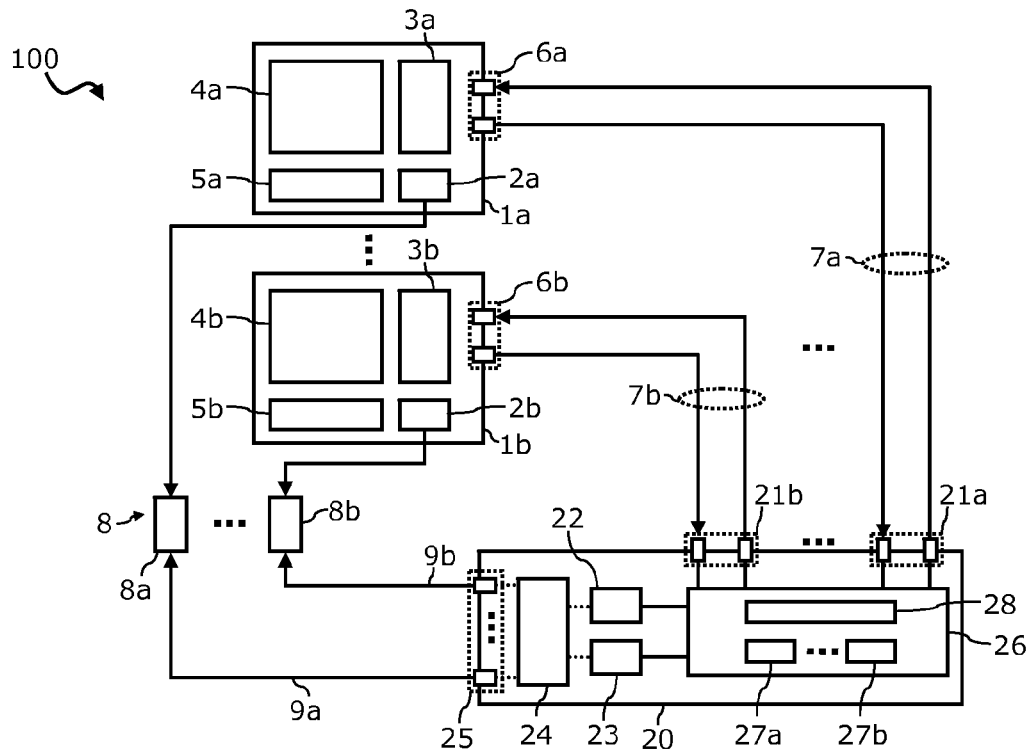
FIG. 1 schematically illustrates a modular testing system according to an embodiment of the invention.
Figure 2:
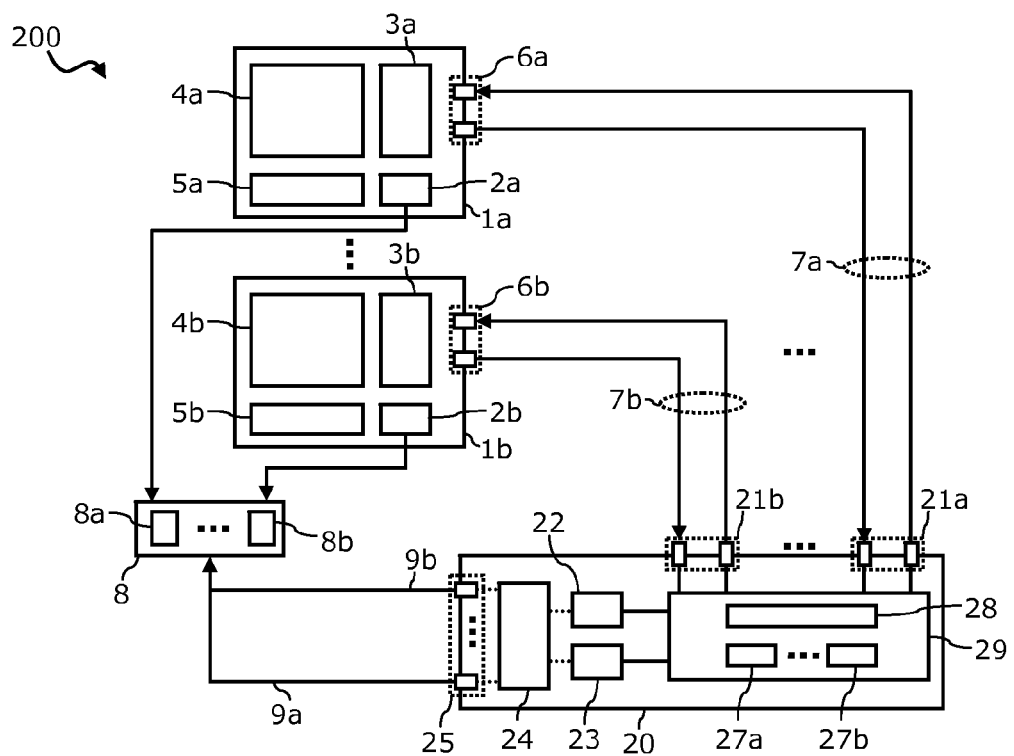
FIG. 2 schematically illustrates a modular testing system according to another embodiment of the invention.

FIGS. 1 and 2 schematically illustrate modular testing systems 100 and 200, respectively. The modular testing systems 100 and 200 may be employed to perform functional tests and testing routines on one or more devices under test (DUT) which are generally denoted with reference sign 8 in FIGS. 1 and 2. Specifically, the modular testing systems 100 and 200 may be used to perform tests for mobile communication or computing devices such as laptops, notebooks, tablets, smartphones, mobile phones, pagers, PDAs, digital still cameras, digital video cameras, portable media players, gaming consoles, virtual reality glasses, mobile PCs and similar electronic equipment. Of course, it should be recognized that other non-mobile electronic equipment may be tested as well, such as—but not limited to—industrial field devices, radio communication base stations, video and TV devices, audio devices like loudspeakers and similar.

The number of DUTs 8 to be tested simultaneously or in parallel is in general not limited to any particular number, but will be determined by the properties and facilities of the testing equipment employed, as will be detailed hereinbelow. Generally, it is desirable to test as many DUTs 8 as possible at the same time in order to increase the efficiency of the testing routines and to keep the overall testing time for a batch of DUTs 8 as short as possible. The modular testing systems 100 and 200 may particularly be configured and adapted to perform a testing method M1 as shown and explained in conjunction with FIG. 4 below. Furthermore, an exemplary signalling sequence chart explaining the operation of the modular testing systems 100 and 200 is illustrated and described in conjunction with FIG. 5 below.

Referring to FIGS. 1 and 2, the modular testing systems 100 and 200 each comprise two separate backend controllers 1a and 1b and a testing front end module 20 coupled to the controllers 1a and 1b. The modular testing systems 100 and 200 may comprise a number of DUTs 8 which are coupled to the at least testing front end module 20 on one hand and to one of the backend controllers 1a and 1b on the other hand.

With reference to the backend controllers, the common features are denoted with the suffix "a" for the first of the backend controllers 1a and with the suffix "b" for the second of the backend controllers 1b. Without loss of generality, the components of both backend controllers 1a and 1b are explained hereinforth in terms of the reference signs without the respective suffix "a" or "b" in each case. Each backend controller 1 may include a testing device controller 2, a testing routine controller 3, a display 4 and one or more input devices 5. In particular, the controllers 1 may comprise a conventional personal computer or a data processing apparatus such as a tablet, a laptop, a notebook, a desktop PC or a similar computing device. The one or more input devices 5 may for example comprise a mouse, a trackball, a keyboard and/or similar user actuated controlling devices. Upon input of commands and/or upon reception and transmission of testing signals the display 4 may be configured to display relevant information to the user of the controller 1. The controller 1 may further comprise one or more central processing units, memory devices, power supply devices and similar apparatuses common for computing devices.

The controller 1 further comprises a controller testing interface 6, for example a USB interface, a PCIe ("Peripheral Component Interconnect Express") interface, a Thunderbolt interface or a Firewire interface. Depending on the type of interface, the controller testing interface 6 may comprise one or more ports to which electrical connectors such as cables may be connected to form wired connections between the controller 1 and the testing front end module 20. The electrical connectors may for example be USB cables, PCIe cables, Thunderbolt cables or Firewire cables.

The length of the electrical connector(s) 7 used to form the wired connections between the controller 1 and the testing front end module 20 may in particular be larger than about 1.5 meters (60 inches), particularly larger than about 2 meters (80 inches), and more particularly larger than about 2.5 meters (100 inches). This has the advantage that there is some leeway in placing the testing front end module 20 near the DUTs 8 and remotely placing the controller 1 at a more convenient and better accessible workplace. The data rate of data transmitted between the controller 1 and the testing front end module 20 via the wired connections in form of the electrical connector(s) 7 may in particular be larger than 1 Mbps, particularly larger than 2 Mbps, more particularly larger than 10 Mbps. The wired connections may be full duplex or at least half-duplex.

The testing routine controller 3 of the controller 1 may be configured to generate testing routine signals to be sent to the testing front end module 20. The testing routine signals may be generated according to the desired testing routine to be performed on one or more of the DUTs 8 respectively coupled to the particular controller 1. The testing routine signals may involve instructions on specific testing signals or testing signal sequences and their respective properties like signal frequency, signal amplitude, signalling strength, pulse duration, pulse rate or similar. The testing signals to be generated on the basis of the testing routine signals may then be generated in the testing front end module 20 upon receipt at its testing signal interface.

The testing routine controller 3 of the controller 1 may further be configured to evaluate any testing response signals that are received from one or more of the plurality of DUTs 8 respectively coupled to the particular controller 1. The testing response signals may collectively be received by the testing front end module 20 in an expected response to one or more of the testing signals emitted by the testing front end module 20. Alternatively or additionally, the testing response signals may be received by the testing front end module 20 upon direct instructions to the DUTs 8 sent by the testing device controller 2.

The testing device controller 2 may be directly (via wire or wirelessly) coupled to each one of the plurality of DUTs 8 and may send out instructions for the DUTs to emit testing response signals. For example, the testing device controller 2 may elicit the DUTs to transmit specific signals or signal sequences of predefined properties, such as signal frequency, signal amplitude, signalling strength, pulse duration, pulse rate or similar.

The DUTs 8 are in turn connected to input/output ports of a testing device interface 25 of the testing front end module 20. As exemplarily shown in FIG. 1, each of the DUTs 8a, 8b is connected by cable 9a, 9b to one of the input/output ports of the testing device interface 25. Alternatively or additionally, it may be possible to connect one DUT 8 to more than one of the input/output ports of the testing device interface 25, as exemplarily shown in FIG. 2. For example, in FIG. 2 DUT 8 that have more than one subcomponents 8a, 8b to test, such as for example MIMO antennae, processing chips or similar components, may be subject to concomitant tests over different testing channels. Thus, such DUTs 8 may be connected to different input/output ports at the same time.

The number of input/output ports of the testing device interface 25 is in principle not limited. However, the number of input/output ports may be four or more, more particularly eight or more. The number of input/output ports will determine how many DUTs and/or how many testing routines may be tested in parallel.

In each of the modular testing systems 100 and 200 two or more backend controllers 1a, 1b are connected to the testing front end module 20 at the same time. Each of the controller testing interfaces 6a, 6b of the controller 1a, 1b is connected to a different one of a plurality of testing signal interfaces 21a, 21b of the testing front end module 20. In those embodiments, the controllers 1a, 1b may simultaneously gain access to the functionality of the testing front end module 20 to be able to test an even greater number of DUTs 8 at the same time. Furthermore, due to the physical separation of the backend controllers 1a, 1b from the testing front end module 20, the controllers 1a, 1b may be in physically separate locations, yet still simultaneously perform testing routines on DUTs 8 in the same location.

The two or more separate backend controllers 1a, 1b may or may not be in communication with each other. Particularly, when the controllers 1a, 1b are not in communication with each other they may perform testing routines on their respectively coupled DUTs 8a, 8b separately and asynchronously. In that case, the testing front end module 20 may be equipped with means to internally balance access of the different controllers 1a, 1b to the commonly employed functional components of the testing front end module 20. That way, the controllers 1a, 1b may perform pipelined testing routines on the DUTs 8a, 8b connected to the same testing front end module 20, i.e. in virtual synchronization.

FIG. 3 schematically illustrates a testing front end module 20 as it may be employed in any of the modular testing systems 100 and 200 of FIGS. 1 and 2. The testing front end module 20 of FIG. 3 may be used in putting the testing method M1 of FIG. 4 into practice. The details of the testing front end module 20 as shown in FIG. 3 are of exemplary nature—it should be understood that different configurations may be possible for the testing front end module 20 depending on the type and nature of the DUTs and test to be performed. Moreover, not every testing front end module 20 within the scope of the disclosure does necessarily need to have each and every subcomponent as exemplarily depicted in FIG. 3.

The testing front end module 20 generally comprises two or more testing signal interfaces 21a, 21b, a vector signal generator (VSG) 22, a vector signal analyser (VSA) 23, a multiplexer/demultiplexer (MUX/DEMUX) 24 and a test device interface 25. The testing signal interface 21 is coupled to each of the VSG 22 and VSA 23 via a respective testing signal interface port 21a and 21b. The testing signal interface 21 may in particular be any of a USB interface, a PCIe interface, a Thunderbolt interface or a Firewire interface.

The VSG 22 is configured to generate testing signals for testing DUTs that may be connected to the test device interface 25 of the testing front end module 20. Upon reception of testing routine signals from one of the backend controllers, such as the controllers 1a and 1b of FIGS. 1 and 2, via one of the testing signal interfaces 21a, 21b, the VSG 22 may generate the testing signals using a processing circuit 10 connected testing signal interface 21. The processing circuit 10 may comprise a processor 18, for example a PLD such as an FPGA or an ASIC. The processing circuit 10 may further comprise a memory 19 such as a flash memory to store firmware, operating software and pre-defined configuration values used for the operation of the processor 18.

Downstream of the processing circuit 10, the VSG 22 may comprise a digital-to-analog converter 11, an RF up-converter 12 and/or a (pre-)amplifier 13. The digital-to-analog converter 11 may be configured to convert the digital testing signals generated by the processing circuit 10 to analog testing signals which are subsequently mixed to the testing frequency with the RF up-converter 12 using a local oscillator frequency. The up-converted testing signals may then be suitably amplified in order to prevent power loss during the subsequent splitting of the testing signals.

The VSA 23 is also coupled to the testing signal interfaces 21 and is configured to receive testing response signals from a plurality of DUTs connected to the test device interface 25. In order to receive and pre-process the testing response signals, the VSA 23 may comprise a (pre-)amplifier 13, an RF down-converter 12 coupled downstream of the amplifier 13 and an analog-to-digital converter 11. The analog-to-digital converter 11 is coupled to a processing circuit 10 which may comprise—similar to the processing circuit 10 of the VSG 22—a processor 18 and a memory 19. The received testing response signals are amplified by the amplifier 13, down-converted to baseband using the RF down-converter 12 and digitized by the analog-to-digital converter 11. The digitized testing response signals are then pre-processed by the processing circuit 10 and transmitted to a respective one of the backend controllers 1a, 1b via one of the testing signal interfaces 21a, 21b for further evaluation and processing. In that regard, the processing circuit 10 and of the VSA 23 does not need to have full testing evaluation capacity and may be kept lightweight and simple.

Both the VSG 22 and the VSA 23 may comprise a separate power supply port 26a and 26b which may be integrated into a common power supply interface of the testing front end module 20. With the separate power supply ports 26a and 26b, the energy demand of the VSG 22 and VSA 23 may be met without the need for a module-internal power supply. To this end, an external power supply may be coupled to the power supply interface of the testing front end module 20. This enables the testing front end module 20 to be kept lightweight and renders a simple cooling concept possible. The cooling may for example be performed by implementing cooling fins on the outside of the housing or shell of the testing front end module 20.

The VSG 22 and the VSA 23 are both coupled to a multiplexer/demultiplexer (MUX/DEMUX) 24. The MUX/DEMUX 24 is generally configured to multiplex the received testing response signals from the DUTs for reception by the VSA 23 and to demultiplex the generated testing signals by the VSG 22 for distribution among the DUTs. The MUX/DEMUX 24 is coupled to the test device interface 25 that may comprise a number of input/output ports 25a, 25b coupled to respective pins of the MUX/DEMUX 24 downstream of the VSG 22 and VSA 23.

The MUX/DEMUX 24 may comprise a multiplexing fabric 14 which switches the inputs of the VSG 22 and VSA 23 to a set of independently controllable attenuators 15. The attenuators 15 may be advantageously used for selective attenuating the power of the respective testing signal channels to the respective DUT connected to the channel. The attenuators 15 may for example comprise Lange or Wilkinson couplers, for example with a coupling factor of 3 dB. The attenuators 15 may be coupled to a set of independently controllable calibration units 16 which may be used to calibrate the MUX/DEMUX 24 and its transient power dissipation. The calibration units 16 may advantageously allow the selective activation of a feedback loop between the VSG 22 and the VSA 23 to calibrate both devices. The calibration units 16 may be coupled to a switch fabric 17 which is configured to selective switch the input/output ports 25a, 25b of the test device interface 25 to one of the VSA 23 and the VSG 22. The switch fabric 17 may for example comprise directional couplers and/or power splitters/combiners.

The testing front end module 20 further comprise a buffering module 29 which is coupled between the plurality of testing signal interfaces 21a, 21b and the VSG 22 and VSA 23. The buffering module 29 is generally configured to resolve any conflicts in command or request sequence of the different (non-synchronized) backend controllers that are coupled to respective ones of the testing signal interfaces 21a, 21b. Moreover, the buffering module 29 is generally configured to distribute the testing response signals received by the VSA 23 from the different DUTs coupled to the test device interface 25 to corresponding backend controllers over the different testing signal interfaces 21a, 21b, depending on which backend controller is responsible for testing which of the coupled DUTs.

The buffering module 29 comprises a pipelining processor 28 which is configured to receive incoming testing routine signal streams from the various backend controllers over the testing signal interfaces 21a, 21b and to forward them to the VSG 22 according to predefined criteria. For example, the pipelining processor 28 may employ a FCFS strategy ("first-come, first-served") that prioritizes the testing routine signal streams from the backend controllers according to order in which the streams arrived, without other preferences or bias. Alternatively, the pipelining processor 28 may employ other forwarding strategies that take into account predefined priority criteria for certain ones of the backend controllers, for certain DUTs to be tested or for certain types of testing routines to be performed by the testing front end module.

The pipelining processor 28 is also configured to transmit received testing response signals from the VSA 23 to the backend controllers. To that end, the pipelining processor 28 may distribute the received testing response signals from the VSA 23 according to the testing signal interfaces 21a, 21b to which the corresponding recipient controllers are coupled. The buffering module 29 may comprise a number of controller-specific databases 27a, 27b each of which is associated with a particular controller to temporarily store received testing response signals from the VSA 23 for that controller until the pipelining processor 28 is able to send them on to the associated controller.

Moreover, the controller-specific databases 27a, 27b may also comprise controller-specific configuration data for the VSA 23. While the memory 19 of the VSA 23 may in that case comprise non-specific configuration data and similar firmware that applies to the operation of the VSA 23 in general, the controller-specific configuration data of the controller-specific databases 27a, 27b may be retrieved by the VSA 23 selectively when the functions of the VSA 23 are used for performing a specific testing routine associated with the respective backend controller belonging to the respective one of the controller-specific databases 27a, 27b.

The functionality of the testing front end module 20 in operation will be explained in conjunction with the testing method M1 as depicted in FIG. 5, while resorting to the example of FIG. 4 for a better understanding of the underlying principles.

FIG. 5 schematically illustrates procedural stages of a testing method M1 for testing electronic equipment. The testing method M1 may be performed using the modular testing systems 100 or 200 of one of the FIGS. 1 and 2 and the testing front end module 20 of FIG. 3. The testing method M1 may advantageously be used for testing a plurality of DUTs, such as mobile communication devices or mobile computing devices.

In the testing method M1, first testing routine signals from a first backend controller are transmitted at M11 to a testing front end module via a wired data connection between the first backend controller and a first testing signal interface of the testing front end module.

At M12, second testing routine signals are transmitted from a second backend controller to the testing front end module via a wired data connection between the second backend controller and a second testing signal interface of the testing front end module.

At M13, one of the first and second testing routine signals is prioritized according to predefined priority criteria in the testing front end module, for example on the basis of FCFS ("first-come, first-served") criteria. At M14, testing signals are generated in the testing front end module on the basis of the prioritized testing routine signals.

It may optionally be possible to split the generated testing signals and transmit the split testing signals from the testing front end module to one of a plurality of DUTs depending on the prioritized testing routine signals. Furthermore, the non-prioritized testing routine signals may be put on hold, i.e. in a buffered pending state, until the testing signals on the basis of the prioritized testing routine signals have been fully generated, i.e. until the VSG 22 is no longer needed for the first testing routine. Subsequently, the VSG may be freed up for the testing routine signals that have been put on hold, i.e. testing signals may be generated thereafter on the basis of the non-prioritized testing routine signals.

Additionally, in the testing method M1, testing response signals from the plurality of DUTs may be received which may be stored in one of a plurality of controller-specific databases in the testing front end module. The stored testing response signals may then be transmitted to an associated one of the first and second backend controller via one of the first and second testing signal interface of the testing front end module.

As can be seen from the exemplary signalling sequence chart in FIG. 4, the testing method M1 may be used for buffering testing stages of concurrent testing routines that are accessing the same functional components of a testing front end module, such as the testing front end module 20 of FIG. 3. The time-line of the chart runs from top to bottom, as indicated by the bold arrow in the middle of the chart of FIG. 4. To the right of the arrow, stages of a first testing routine initiated by a first backend controller coupled to a testing front end module are shown, while on the left hand side of the arrow stages of a second, concomitant testing routine initiated independently of the first testing routine by a second backend controller coupled to the testing front end module are indicated.

The first testing routine on the right hand side may for example start with one or more preparatory stages C1a of the first backend controller and/or the respective DUT to be tested. For example, the preparatory stages C1a may involve initiating a testing state of the DUT to be tested, setting a testing configuration within the DUT, ensuring that the DUT is ready for testing, or similar. Those preparatory stages C1a do not resort to the functional capabilities of components of the testing front end module, such as the multiplexer/demultiplexer, the VSG and/or the VSA.

During execution of the preparatory stages C1a of the first backend controller, a second backend controller may initiate preparatory stages C1b of a second testing routine for a different DUT or a different subcomponent of the same DUT as for the first testing routine. The preparatory stages C1a and C1b are not necessarily synchronized with each other, specifically not with regard to their execution timing.

After the preparatory stages C1a of the first testing routine have been finished at time T1, the first backend controller needs to resort to one or more of the functional components of the testing front end module. At time T1, the preparatory stages C1b of the second testing routine are still underway. Thus, when the testing stages D1a of the first testing routine are performed between a time T1 and T2, the second backend controller may not have access to the functional components of the testing front end module since they are still occupied with execution of the testing stages D1a. Thus, the buffering module of the testing front end module will put the testing stages D1b of the second testing routine that would have followed directly on the end of the preparatory stages C1b of the second testing routine on hold, as indicated by the arrow P.

The testing stages of the testing routines may for example include transmitting testing signals to the DUTs, receiving testing response signals from the DUTs, transferring received data from the VSA to the controller individual databases and similar measures.

Only when the testing stages D1a of the first testing routine have been finished at time T2, the pendency of the testing stages D1b of the second testing routine is lifted and the testing stages D1b may commence. During that time, the first testing routine may continue independently from the second testing routine with further preparatory stages C2a that do not need to access the testing front end module and may exemplarily start at time T3. Those further preparatory stages C2a, for example evaluation of testing response signals in the first backend controller, changing the configuration of the DUT for the next test, or similar may be performed in parallel to the testing stages D1b of the second testing routine.

At time T4, when the further testing stages D2a of the first testing routine would have commenced, the first testing routine is put on hold P by the buffering module of the testing front end module. The hold P is only lifted at time T5, when the testing stages D1b of the second testing routine have been finished. The second testing routine may then continue with further preparatory stages C2b, similar to the first testing routine, during the execution of the further testing stages D1b of the second testing routine.

As can be seen from FIG. 4, the idle time of the testing front end module with respect to the first testing routine, i.e. the time between time T2 and T5 may at least partially be put to use for performance of the second testing routine, thereby reducing the overall idle time of the testing front end module and increasing its testing efficiency.

Processing circuits in the specification may, for example, be or comprise a microprocessor or microcontroller. Such processing circuits may be employed in a processing device, for example a central processing unit (CPU) and/or a coprocessor and/or a digital signal processor and/or an embedded processor. The processing circuit may for instance include one, or more, processor cores which can execute the instructions in a memory connected to the processor core. The processor cores may for instance include the logic circuitry required to execute program code in the form of machine code. The processor cores may for instance at least include an instruction decoder, an arithmetic unit, an address generation unit, and a load/store unit. The processing circuit may for example include, in addition to the processor core, inputs/outputs or other components, such as and/or communication interfaces and/or coprocessors and/or analog-to-digital converters and/or clocks and reset generation units, voltage regulators, memory (such as for instance flash, EEPROM, RAM), error correction code logic and/or timers or other suitable components.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections between various elements as shown and described with respect to the drawings may be a type of connection suitable to transfer signals from or to the respective nodes, units or devices, for example via intermediate devices. Accordingly, unless implied or stated otherwise the connections may for example be direct connections or indirect connections.

Because the apparatus implementing the present invention is, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Also, the invention is not limited to physical devices or units implemented in non-programmable hardware, but can also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device. Those skilled in the art will recognize that the boundaries between logic or functional blocks are merely illustrative and that alternative embodiments may merge logic or functional blocks or impose an alternate decomposition of functionality upon various logic or functional blocks.

In the description, any reference signs shall not be construed as limiting the claim. The word "comprising" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage. The order of method steps as presented in a claim does not prejudice the order in which the steps may actually be carried, unless specifically recited in the claim.

Skilled artisans will appreciate that the illustrations of chosen elements in the drawings are only used to help to improve the understanding of the functionality and the arrangements of these elements in various embodiments of the present invention. Also, common and well understood elements that are useful or necessary in a commercially feasible embodiment are generally not depicted in the drawings in order to facilitate the understanding of the technical concept of these various embodiments of the present invention. It will further be appreciated that certain procedural stages in the described methods may be described or depicted in a particular order of occurrence while those skilled in the art will understand that such specificity with respect to sequence is not actually required.

What is claimed is:

1. A testing method for testing a plurality of devices under test (DUT) coupled to a testing front end module that is coupled to a first backend controller and a second backend controller, the method comprising:
   transmitting first testing routine signals from the first backend controller to the testing front end module via a wired data connection between the first backend controller and a first testing signal interface of the testing front end module;
   transmitting second testing routine signals from the second backend controller to the testing front end module via a wired data connection between the second backend controller and a second testing signal interface of the testing front end module;
   prioritizing one of the first and second testing routine signals according to predefined priority criteria in the testing front end module, wherein prioritizing comprises prioritizing based on one or more of a first-come, first-served basis, a priority between the first backend controller and the second backend controller, a priority between the plurality of devices under test, or types of the first and second testing routine signals;
   generating testing signals in the testing front end module on the basis of the prioritized testing routine signals; and
   outputting the prioritized testing routine signal of the first and second testing routine signals to one or more of the plurality of devices under test.

2. The testing method of claim 1, wherein the wired data connection is a USB connection, a PCIe connection, a Thunderbolt connection or a Firewire connection.

3. The testing method of claim 1, further comprising:
   splitting the generated testing signals and transmitting the split testing signals from the testing front end module to one of a plurality of DUTs depending on the prioritized testing routine signals.

4. The testing method of claim 1, further comprising:
   putting the non-prioritized one of the first and second testing routine signals on hold until generating testing signals on the basis of the prioritized testing routine signals has terminated; and
   subsequently, generating testing signals in the testing front end module on the basis of the non-prioritized testing routine signals.

5. The testing method of claim 1, further comprising:
   receiving testing response signals from the plurality of DUTs;

storing the received testing response signals in one of a plurality of controller-specific databases in the testing front end module; and transmitting the stored testing response signals to an associated one of the first and second backend controller via one of the first and second testing signal interface of the testing front end module.

6. The method of claim 1, wherein transmitting the first testing routine signals comprises transmitting, in response to user interaction with the first backend controller for selecting the first testing routine, the first testing routine signals from the first backend controller to the testing front end module, and wherein transmitting the second testing routine signals comprises transmitting, in response to user interaction with the second backend controller for selecting the second testing routine, the second testing routine signals from the second backend controller to the testing front end module.

7. The method of claim 1, wherein the wired data connection between the first backend controller and the first testing signal interface of the testing front end module is greater than 1.5 meters, and wherein the wired data connection between the second backend controller and the second testing signal interface of the testing front end module is greater than 1.5 meters.

8. The method of claim 1, wherein generating testing signals comprises:
generating a first testing signal, of the testing signals, in the testing front end module for a first DUT of the plurality of DUTs; and
subsequent to generating the first testing signal, generating a second testing signal, of the testing signals, in the testing front end module for a second DUT of the plurality of DUTs.

9. A testing front end module for testing a plurality of devices under test (DUT) coupled to the testing front end module, the testing front end module comprising:
at least two testing signal interfaces for coupling different backend controllers to the testing front end module, wherein the testing front end module is coupled to a first backend controller and a second backend controller;
a vector signal generator (VSG) coupled to the testing signal interface and configured to generate testing signals upon reception of testing routine signals from a remote controller via the testing signal interface;
a vector signal analyser (VSA) coupled to the testing signal interface and configured to receive testing response signals from a plurality of DUTs and to transmit the received testing response signals to the remote controller via the testing signal interface; and
a buffering module coupled to the at least two testing signal interfaces and configured to receive first and second testing routine signals from the first backend controller and the second backend controller, respectively, to:
prioritize one of the first and second testing routine signals according to predefined priority criteria, wherein to prioritize, the buffering module is configured to prioritize based on one or more of a first-come, first-served basis, a priority between the first backend controller and the second backend controller, a priority between the plurality of devices under test, or types of the first and second testing routine signals; and
transmit the prioritized one of the first and second testing routine signals to the VSG for generating testing signals for the plurality of DUTs on the basis of the prioritized one of the first and second testing routine signals.

10. The testing front end module of claim 9, wherein the test device interface comprises at least four input/output ports configured to be connected to DUTs.

11. The testing front end module of claim 10, wherein the test device interface comprises at least eight input/output ports configured to be connected to DUTs.

12. The testing front end module of claim 9, wherein the at least two testing signal interfaces comprise one or more of a USB port, a PCIe port, a Thunderbolt port and a Firewire port.

13. The testing front end module of claim 9, further comprising:
a multiplexer/demultiplexer (MUX/DEMUX) coupled to the VSG and the VSA, the MUX/DEMUX being configured to multiplex the received testing response signals and to demultiplex the generated testing signals; and
a test device interface coupled to the MUX/DEMUX and configured to couple the testing front end module to the plurality of DUTs.

14. The testing front end module of claim 13, wherein the MUX/DEMUX comprises at least one of a set of independently controllable attenuators, a set of independently controllable calibration units, and a switch fabric configured to selective switch the input/output ports of the test device interface to one of the VSA and the VSG.

15. The testing front end module of claim 9, wherein the buffering module comprises at least two controller-specific databases and wherein the buffering module is further configured to store received testing response signals from the plurality of DUTs in one of the plurality of controller-specific databases.

16. The testing front end module of claim 9, wherein the buffering module is further configured to put the non-prioritized one of the first and second testing routine signals on hold until the VSG has terminated generating testing signals on the basis of the prioritized testing routine signals.

17. A testing system for testing a plurality of devices under test (DUT), the testing system comprising:
at least two backend controllers comprising a first backend controller and a second backend controller; and
a testing front end module coupled to the plurality of devices under test, the testing front end module comprising:
at least two testing signal interfaces for coupling the testing front end module to the first backend controller and the second backend controller;
a vector signal generator (VSG) coupled to the testing signal interface and configured to generate testing signals upon reception of testing routine signals from a remote controller via the testing signal interface;
a vector signal analyser (VSA) coupled to the testing signal interface and configured to receive testing response signals from a plurality of DUTs and to transmit the received testing response signals to the remote controller via the testing signal interface; and
a buffering module coupled to the at least two testing signal interfaces and configured to receive first and second testing routine signals from the first backend controller and the second backend controller, respectively, to:
prioritize one of the first and second testing routine signals according to predefined priority criteria, wherein to prioritize, the buffering module is configured to prioritize based on one or more of a first-come, first-served basis, a priority between the first backend controller and the second backend controller, a priority between the plurality of devices under test, or types of the first and second testing routine signals; and transmit the prioritized one of the first and second testing routine signals to the VSG for generating testing signals for the plurality of DUTs on the basis of the prioritized one of the first and second testing routine signals, wherein the backend controllers are coupled to respective ones of the at least two testing signal interfaces.

18. The testing system of claim 17, wherein the at least two testing signal interfaces of the testing front end module comprise one or more of a USB port, a PCIe port, a Thunderbolt port and a Firewire port.

19. The testing system of claim 17, wherein the MUX/DEMUX of the testing front end module comprises at least one of a set of independently controllable attenuators, a set of independently controllable calibration units, and a switch fabric configured to selective switch input/output ports of the test device interface to one of the VSA and the VSG.

\* \* \* \* \*